US008442043B2

(12) United States Patent
Sharma et al.

(10) Patent No.: US 8,442,043 B2
(45) Date of Patent: May 14, 2013

(54) SERVICE SELECTION MECHANISM IN SERVICE INSERTION ARCHITECTURE DATA PLANE

(75) Inventors: Govind Sharma, Union City, CA (US); Paul Quinn, San Francisco, CA (US); Kenneth Durazzo, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 12/344,816

(22) Filed: Dec. 29, 2008

(65) Prior Publication Data
US 2010/0165985 A1 Jul. 1, 2010

(51) Int. Cl.
*H04L 12/28* (2006.01)
(52) U.S. Cl.
USPC ............ 370/389; 370/351; 370/473; 370/386
(58) Field of Classification Search .................. 370/389, 370/401, 390, 392; 455/426.1, 414.1, 412.1; 709/246, 248, 313, 201, 202, 203, 223, 224, 709/238, 243, 249; 707/201, 203, 10, 200
See application file for complete search history.

(56) References Cited

U.S. PATENT DOCUMENTS

| 3,629,512 | A | 12/1971 | Yuan |
| 5,408,231 | A | 4/1995 | Bowdon |
| 5,491,690 | A | 2/1996 | Alfonsi et al. |
| 5,600,638 | A | 2/1997 | Bertin et al. |
| 5,687,167 | A | 11/1997 | Bertin et al. |
| 6,400,681 | B1 | 6/2002 | Bertin et al. |
| 6,661,797 | B1 | 12/2003 | Goel et al. |
| 6,687,229 | B1 | 2/2004 | Kataria et al. |
| 6,993,593 | B2 | 1/2006 | Iwata |
| 7,095,715 | B2 | 8/2006 | Buckman et al. |
| 7,486,622 | B2 | 2/2009 | Regan et al. |
| 7,684,321 | B2 | 3/2010 | Muirhead et al. |
| 7,860,100 | B2 | 12/2010 | Khalid et al. |
| 2002/0156893 | A1 | 10/2002 | Pouyoul et al. |

(Continued)

FOREIGN PATENT DOCUMENTS

| EP | 2122483 | 7/2008 |
| WO | WO 2008/088954 | 7/2008 |

OTHER PUBLICATIONS

Quinn, P., U.S. Appl. No. 11/655,363, filed Jan. 19, 2007, "Service Insertion Architecture".

(Continued)

*Primary Examiner* — Hassan Phillips
*Assistant Examiner* — Anez Ebrahim
(74) *Attorney, Agent, or Firm* — Patent Capital Group

(57) ABSTRACT

As described herein, explicit service ordering information may be associated with each of a plurality of logical services in a service path. A unique sequence number, for example, may be assigned, and associated with each service in the path. The sequence number may be assigned by a service broker in the control plane of a service insertion architecture that provides a platform-independent framework to insert services into a network. The sequence number may represent the relative ordering of the service with respect to the other services in the path. The sequence number, along with a traffic classification identifier, constitutes the shared context that is tagged to the packet injected into the chain which is used in the SIA data plane to virtualize and uniquely select series of services defined in the policy.

18 Claims, 3 Drawing Sheets

U.S. PATENT DOCUMENTS

| | | | |
|---|---|---|---|
| 2002/0167935 | A1 | 11/2002 | Nabkel et al. |
| 2003/0110081 | A1 | 6/2003 | Tosaki |
| 2003/0226142 | A1 | 12/2003 | Rand |
| 2004/0148391 | A1 | 7/2004 | Lake et al. |
| 2004/0199812 | A1* | 10/2004 | Earl et al. .................. 714/13 |
| 2005/0044197 | A1 | 2/2005 | Lai |
| 2005/0086367 | A1* | 4/2005 | Conta et al. ................ 709/238 |
| 2005/0160180 | A1* | 7/2005 | Rabje et al. ................ 709/238 |
| 2005/0281257 | A1* | 12/2005 | Yazaki et al. ............... 370/389 |
| 2005/0289244 | A1 | 12/2005 | Sahu et al. |
| 2006/0074502 | A1 | 4/2006 | McFarland |
| 2006/0112400 | A1 | 5/2006 | Zhang et al. |
| 2006/0168223 | A1* | 7/2006 | Mishra et al. ............... 709/225 |
| 2007/0237147 | A1* | 10/2007 | Quinn et al. ................ 370/392 |
| 2008/0080509 | A1 | 4/2008 | Khanna et al. |
| 2008/0080517 | A1 | 4/2008 | Roy et al. |
| 2008/0170542 | A1* | 7/2008 | Hu ................................ 370/328 |
| 2008/0177896 | A1 | 7/2008 | Quinn |
| 2008/0219287 | A1* | 9/2008 | Krueger et al. ............. 370/458 |

OTHER PUBLICATIONS

Singh, Sumeet et al., Service Portability: Why HTTP redirect is the model for the future [on line], Nov. 2006 [retrieved on Sep. 8, 2009], retrieved from the Internet: <URL:http://conferences.sigcomm.org/hotnets/2006/singh06service.pdf>.

Ladner, Roy, et al., "Case-Based Classification Alternatives to Ontologies for Automated Web Service Discovery and Integration" proceedings of the SPIE—The International Society for Optical Engineering, Apr. 17, 2006, 8 pages.

Lemmens, Rob, et al., "Semantic and Syntactic Service Descriptions at Work in Geo-service Chaining", 9th Agile International Conference on Geographic Information Science, Apr. 20, 2006, 11 pages.

Kiehle, Christian, et al., "Standardized Geoprocessing—Taking Spatial Data Infrastructures One Step Further", 9th Agile International Conference on Geographic Information Science, Apr. 22, 2006, 10 pages.

Notification of Transmittal of the International Search Report and the Written Opinion of the International Searching Authority, or the Declaration (1 page), International Search Report (2 pages), International Preliminary Report on Patentability (1 page), and Written Opinion of the International Searching Authority (4 pages) mailed May 13, 2009 for International Application No. PCT/US08/50349.

U.S. Appl No. 12/537,383, filed Aug. 7, 2009, entitled "Service Enabled Network," Inventor(s): Pere Monclus, et al.

U.S. Appl. No. 13/100,130, filed May 3, 2011, entitled "Mobile Service Routing in a Network Environment," Inventor(s): Muhammad A. Khan et al.

PCT International Search Report mailed May 13, 2009 for International Application No. PCT/US2008/050349.

EPO Communication (1 page), European Search Opinion (3 pages) and Supplementary European Search Report (2 pages) mailed Apr. 7, 2010 for EP Application No, 08705725.3.

USPTO Apr. 16, 2012 Non-Final Office Action from U.S. Appl. No. 11/655,363.

USPTO Jul. 16, 2012 Response to Apr. 16, 2012 Non-Final Office Action from U.S. Appl. No. 11/655,363.

* cited by examiner

Service policy Red:
Service X => Service Y => Service Z
    SN1            SN2           SN1

FIG. 2

Service Class Instance Coke-Red (Traffic Classification Id 100):
100 (seq#0)    =>   100 (seq#1) => 100 (seq#2) => 100 (seq#3)
SCL Coke-Red          SN1            SN2           SN1

FIG. 3

SIA Context Match

| (Traffic Class Id : Seq No) | Next Hop Location |
|---|---|
| 100:0 | Service X Location |
| 100:1 | Service Y Location |
| 100:2 | Service Z Location |
| 100:3 | Forward to Destination |

FIG. 4

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Ver (2) | | Traffic Classification Id (22) - scale max 4194304 distinct paths (4 million) | | | | | | | | | | | | | | | | | | | | | Service sequence Number (8) - max 256 services in path | | | | | | | | |

US 8,442,043 B2

SERVICE SELECTION MECHANISM IN SERVICE INSERTION ARCHITECTURE DATA PLANE

BACKGROUND

Service insertion architecture (SIA) provides a platform-independent framework for service virtualization and dynamic service insertion into a network. An example SIA is described and claimed in U.S. patent application Ser. No. 11/655,363, filed on Jan. 19, 2007, the disclosure of which is hereby incorporated herein by reference.

The devices at the edge of the SIA domain classify the interested traffic, placing the classification result inside of a shared SIA context, and then redirecting the tagged packet to the next hop service in the SIA service path. Each service hop in the path receives the packet, uses the shared context to identify the traffic classification, and applies the appropriate service policy associated with the SIA classification. After service application, it derives the next hop in the service path associated with the shared context in the packet and then sends the traffic to the next service node. The final service in the path removes the shared context from the packet and forwards the packet to the original destination.

A consideration in SIA path forwarding is to uniquely select the next service in a path in a generic way, without depending on any transport mechanism of the underlying platform. As the traffic classification id of the SIA context in the packet remains constant throughout the service path, it alone is not adequate for selecting the next service in the path for all topologies. Multiple services can be co-located in the same physical service hosting device, and the SIA packet may be seen multiple times by the SIA forwarding plane of the physical device. There is no information in the SIA context, as it is currently defined, that can be used by the data plane to determine the previous hop from which the packet is received to uniquely select the next service in path. Consequently, an SIA packet cannot be switched as desired in a service path, and may cause loops or forwarding ambiguities.

A generic solution for SIA data plane switching that addresses these looping and path ambiguity concerns would be desirable. It would be particularly desirable if such a solution were to leverage existing networking industry standards so that the hardware-based platforms do not require any ASIC re-spins.

SUMMARY

Described herein is a generic mechanism for selecting next-hop service in SIA data plane switching. Explicit service ordering information, in the form of a sequence number, for example, may be associated with each logical service in a service path definition. The unique sequence number, which may be assigned by a service broker, may represent the relative ordering of the service with respect to the other services in the path.

As part of path segment updates, the service broker may distribute to the forwarding plane of the physical device, the corresponding SIA context (e.g., traffic classification id and sequence number), and the next hop information for each segment in the path. The forwarding plane may store this information in the form of a switching table.

At the data plane, each logical hop in the service path may update the SIA context in the packet with its own service sequence number and, if needed, modify the SIA traffic class before sending it to the forwarding plane for service chaining to the next hop. The forwarding plane may use the combination of the traffic classification id and sequence number (of the previous service) in the SIA context to lookup the switching table and determine the next hop location. The next hop location can be an in-box service module slot/port or a tunnel to out-of-box service. Thus, the next service hop can be uniquely determined without any forwarding ambiguity.

BRIEF DESCRIPTION OF THE DRAWINGS

FIG. 2 depicts a first example service path definition.

FIG. 3 depicts a second example service path definition.

FIG. 4 depicts an example SIA switching table.

DETAILED DESCRIPTION OF ILLUSTRATIVE EMBODIMENTS

Figure 1:
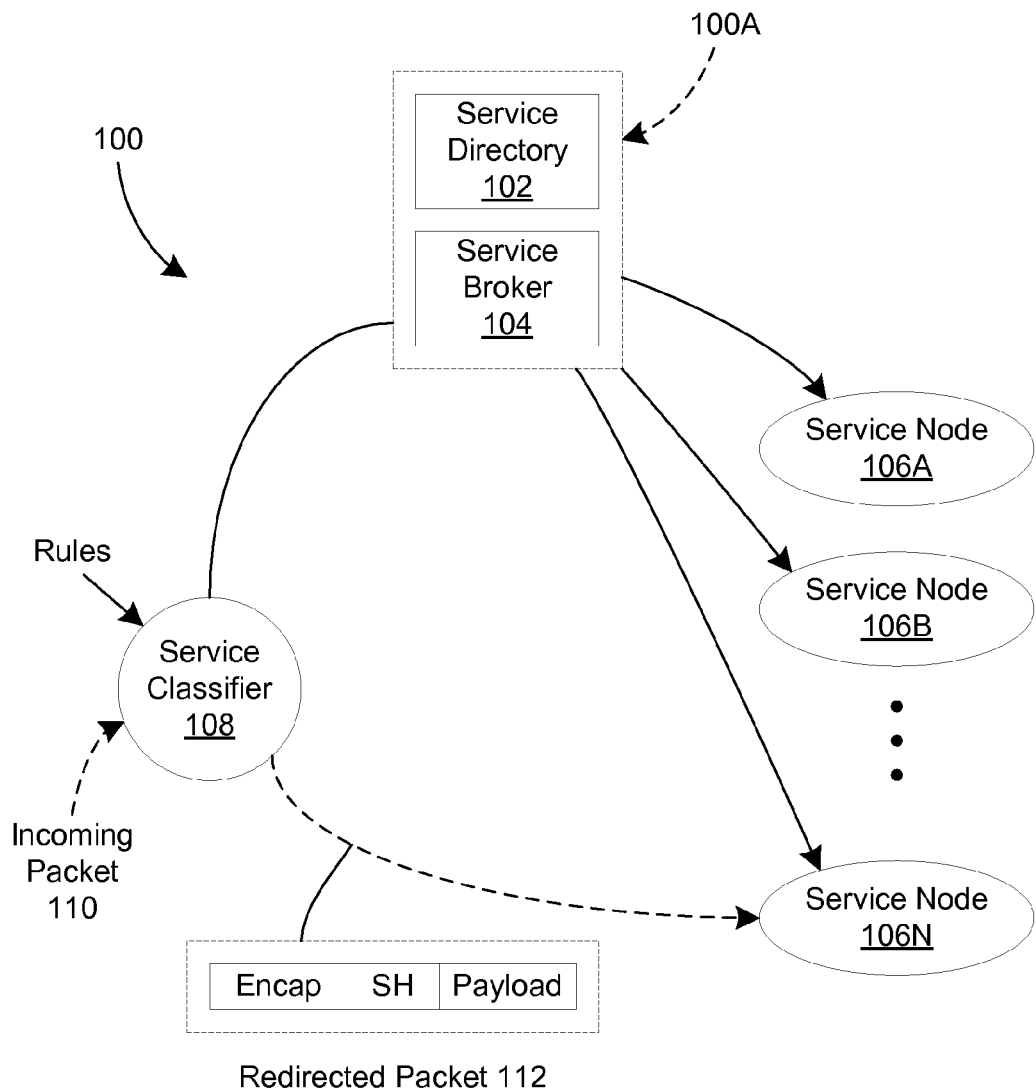
FIG. 1 is a functional block diagram of an example service insertion architecture.

FIG. 1 is a functional block diagram of an example SIA 100. The SIA 100 may include a control plane component 100A. The control plane component 100A may include a service directory 102 and a service broker 104. The service directory 102 may be used to define service policies. Each service policy may include one or more abstract service path definitions. Each service path gets instantiated and associated with a service class as requested by a service classifier 108 and is known as service class instance. The instantiated service class contains a classifier shared context, inserted by a service classifier 108, and service hops connecting the elements in the path in the order defined by the policy. Thus, the service classifier 108 may be the consumer of the services, the service nodes 106A-N may be the providers of the services, and the service path may define the service locations and its ordering.

The service broker 104 may be the central authority that keeps track of available services. It may allocate service class instances to classifiers in the SIA domain based on a certain policy. It may also be responsible for setting up service path communication channels between physical devices, where the service elements (e.g., service classifiers 108 and service nodes 106) are located in the SIA domain.

In the data plane, the classifier 108 may intercept the interested traffic (e.g., incoming packet 110), insert the shared context, and redirect it (112) into the service path. The traffic in the path may flow from one service to another, in the order in which it was provisioned, until it reaches the last service node, which may be responsible for forwarding it to the original destination. Logically, the classifiers 108 and the service nodes 106 in a path can be located anywhere in the SIA service domain network 100. For example, these elements can be co-located in the same router or switch, or they can be distributed in the network 100.

The SIA data plane functions can be divided into: a) Classification and SIA Shared Context Tagging, b) Redirection, and c) Service Selection. In Classification and SIA Shared Context Tagging, the classifier may intercept the interested traffic 110 and add a unique id—the "traffic classification id"—to the packets that enter into the service path. This id conveys the traffic classification, i.e., the result of classification by the SCL, to the service nodes 106 in the chain. The service nodes 106 may use this id to apply service-specific polices to the packets. The id may remain constant in SIA forwarding plane. It may also represent the service path in an SIA domain. If the path is linear, it is may be referred to as a chain. The id in combination with the sequence number is used to derive the path to the next hop at each service node. The id may be used to virtualize services in the network, which means that, irrespective of the service device location, the packet tagged with the same classification id will always undergo the same set of services in the SIA domain.

In Redirection, each SIA physical device, at the data plane level, may redirect the tagged packets to the next-hop physical device in the service path. The redirection may be done using the available transport mechanisms of the underlying network. SIA does not assume a particular redirection transport mechanism. For example, the transport mechanism could be a generic routing encapsulation ("GRE") tunnel in an internet protocol ("IP") network, or a Layer 2 Tunnel Protocol (L2TP) or Multi-Protocol Label Switching ("MPLS") tunnel in an MPLS network, some form of layer 2 tunnel in a layer 2 only network, or a slot/port for an inter-chassis service module. This redirection tunnel may be shared between two physically or logically adjacent SIA devices, and may be used to carry the entire SIA traffic for multiple service class instances that flows between the two devices.

The Service Selection functionality may be performed by the SIA forwarding plane, which may be separated from the service plane, where the service resides on the physical device. For example, the service may reside on a service module, and the SIA forwarding plane on the Forwarding Engine ASIC for hardware switching platforms, or Route Processor in the case of software switching platforms, for example. The SIA forwarding plane may use the SIA shared context of the received packet to determine the next service and its location.

In SIA, an abstract service policy may be defined as an ordered list of services on the service broker 104. When a classifier 108 requests a particular service class instance, service path gets instantiated and a shared context is allocated. The service broker 104 returns this shared context and the next hop location of first service in the path. The SIA context is tagged with the packet and traverses the service path.

An example service path definition is depicted diagrammatically in FIG. 2. Assume service X and service Z are on the same physical device, SN1, and that Service Y is on physical device SN2. In the data path, the service classifier classifies the packets on the edge device, tags them with an id (say, 100), and redirects the tagged packets to SN1, where service X resides. SN1 receives the packet, applies the appropriate service for id 100 (which, in this example, is service X), and redirects it to SN2, where service Y resides. SN2 receives the packet, applies the appropriate service for id 100 (which, in this example, is service Y), and redirects it to SN1, where service Z resides. In this case, the forwarding plane of SN1 cannot uniquely select a next service, as it can receive an SIA packet with id 100 from two different previous hops, i.e., one from the service classifier 108, and another from SN2 (Service Y).

As described herein, explicit service ordering information may be associated with each logical service in a service path definition. A unique sequence number, for example, may be assigned, and associated with each logical service in the service path by the service broker. The sequence number may represent the relative ordering of the service with respect to the other services in the path. FIG. 3 depicts the service class instance of FIG. 2 with this change.

As part of the path segment updates, the service broker distributes to the forwarding plane of the physical device the corresponding SIA context (e.g., traffic classification id and sequence number) and the next hop information for each path segment. The forwarding plane can store this information in the form of a switching table. As an example, at SN1 the table may look as depicted in FIG. 4.

In the data plane, each logical hop in the service path updates the SIA context in the packet with its own service sequence number before sending it to the forwarding plane for service chaining to the next hop. The forwarding plane uses the combination of traffic classification id and sequence number (of the previous service) in the SIA context to look up the switching table and determine the next hop location. The next hop location can be an in-box service module slot/port, or a tunnel to out-of-box service. This approach gives a mechanism to uniquely determine the next service hop without any forwarding ambiguity.

Following are some example implementations for different platforms for the SIA switching table. In one example, the SIA context can be overlayed on a 32 bit header and transported between SIA entities (e.g., the service classifier and service nodes), irrespective of whether they are located in the same chassis or distributed in the network. For hardware platforms, access control list ("ACL") ternary content addressable memories ("TCAMs") can be used to implement the SIA switching table. The SIA packets in the forwarding plane can be matched using the shared context field (traffic classification and sequence number) in the header against the SIA switching table entries programmed in the TCAM to uniquely select the next hop service.

Figures 5, 6:
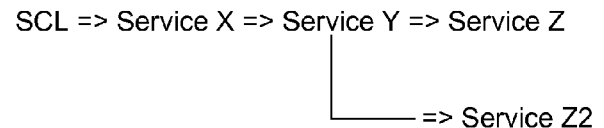
FIG. 5 depicts an example SIA shared context tagged in a packet.
FIG. 6 depicts a forked service path.

An example SIA packet format for this implementation is depicted in FIG. 5. The 2-bit "Ver" field represents a version of the SIA Header, the 22-bit Traffic Classification Id field represents class of traffic, and the 8-bit Service Sequence Number field represents 256 maximum services in the service path.

For in-chassis service chaining, on hardware platforms, for example, the SIA context can be overlayed to any available protocol header that can be looked up using, for example, an ACL TCAM lookup key. The protocol header may be, for example, a 32-bit value protocol header. The switching table can then be implemented in ACL TCAM.

For software-based platforms that use a single Route Processor for SIA service chaining, a hash table in software may be used to implement the SIA switching table. The hash table entries can match on the SIA Context as a key to uniquely determine the next hop service.

Several advantages of the disclosed approach should be understood from the foregoing description. For example, service path selection may be made independent of any network topology dependent techniques such as VLAN stitching or Policy based Routing to chain multiple services. It ensures that whenever the SIA packet comes to forwarding plane, since the SIA context is always unique, the next hop can be determined uniquely. This makes the SIA forwarding plane architecture consistent across deployments and platforms from architecture point of view without depending on any platform specifics or dependence on tunnels, etc., for service selection in the service path. Thus, a service need not reclassify traffic, and services can share class information. The network informs the services, and the class information allows the services to make decisions about path-based on traffic, and not just about L2/L3 information.

As it provides consistency in the data plane for service selection and chaining, it makes the SIA architecture easily and equally adaptable on hardware or software platforms without requiring any need for ASIC re-spins or service specific modifications. The sequence number may also serve the purpose of TTL (Time to Live) for packets in the data plane.

A service path need not be linear, it may fork into more than one branch if desired, or form a graph. For example, a forked chain can be easily defined, as shown in FIG. 6. As shown, the SIA packets originated from service Y can take two possible paths, one to service Z1 and other to service Z2. As long as a unique sequence number is used at service Y for different branches, the forwarding plane can uniquely forward the packets in the above path by using the traffic classification id and seq number combination.

Thus, the sequence number can convey some service specific state information to the next service. Also, the service broker remains the sole authority for allocation and distribution of the SIA contexts (traffic classification id and sequence numbers) to service nodes and the forwarding plane. It makes services implementation very simple as the service chaining function is performed by the forwarding plane in the case of hardware assisted switching platforms or Route Processor in case of software platforms.

Management and troubleshooting becomes easier for any sniffed SIA packet in the path as the SIA context can give the complete tracking information at what stage of the path the packet is. If there are changes to the service path after a packet has entered the path, such a refinement or modification of the traffic classification, a new class ID may be used.

Another advantage of the disclosed approach is virtualized service support. The concept of "shared context" enables the deployment of virtual service instances since the context is independent from the forwarding topology. For example, a first context can indicate email for a first customer, while a second context can indicate email for a second customer, with both contexts being delivered to the same physical firewall. Using the context headers, the physical firewall can deliver the right packet to the right virtual firewall. Furthermore, combining the context and the sequence number allows for selection of multiple instances of the same services inside a node or a tree/chain.

What is claimed:

1. A method for providing service selection in a service insertion architecture data plane, the method comprising:
    generating, at a first service node, a first packet that includes unique service ordering information associated with a first logical service performed at the first service node;
    providing the first packet to a forwarding plane in the service insertion architecture as part of a service path, wherein in the service path is non-linear and forks into more than one branch; and
    providing the first packet to a second service node that is identified by the forwarding plane as a next hop location based on the unique service ordering information included in the first packet, wherein a second logical service in the service path is performed at the second service node, and wherein the service forwarding information includes a first traffic class identifier and a first sequence number associated with an ordering of the first logical service in the service path, and wherein the forwarding plane is configured to evaluate the first traffic class identifier and the first sequence number in a service insertion architecture (SIA) context against a switching table to determine the next hop, wherein if the first packet and a second packet have the same traffic class identifier, they will undergo the same set of services in the SIA plane.

2. The method of claim 1, wherein the first logical service is one of a plurality of logical services in a service path.

3. The method of claim 1, wherein the traffic class identifier and a second traffic class identifier are ordered relative to other logical service identifiers of the service path.

4. The method of claim 3, wherein the traffic class identifier and the second traffic class identifier are allocated dynamically by a control plane element.

5. The method of claim 3, wherein sequence numbers are allocated dynamically by a control plane element.

6. The method of claim 1, wherein the forwarding plane maintains the switching table from which the next hop location is determined based on the unique service ordering information included in the first packet.

7. The method of claim 6, wherein the switching table is implemented in an access control list ("ACL") ternary content addressable memory ("TCAM").

8. A method for providing service selection in a service insertion architecture data plane, the method comprising:
    receiving a first packet that includes a traffic class identifier associated with a traffic class, from which a service context and a service path are derived, wherein in the service path is non-linear and forks into more than one branch, the service path comprising a uniquely ordered plurality of logical services, the first packet further including a first sequence number;
    performing a logical service after receiving the first packet;
    generating a second packet that includes the original traffic class identifier and a second sequence number, wherein the second sequence number is different from the first sequence number; and
    providing the second packet to a forwarding plane in the service insertion architecture, wherein the forwarding plane is configured to evaluate the traffic class identifier and the first sequence number in a service insertion architecture (SIA) context against a switching table to determine a next hop, wherein if the first packet and a third packet have the same traffic class identifier, they will undergo the same set of services in the SIA plane.

9. The method of claim 8, wherein the forwarding plane stores in the switching table a corresponding context and next hop information for each of a plurality of path segments that form the service path.

10. The method of claim 9, wherein each service context is defined by a unique traffic class identifier and sequence number.

11. The method of claim 10, wherein the forwarding plane uses the traffic class identifier and a sequence number provided in the received first packet to look up the switching table and determine a next hop location.

12. The method of claim 11, wherein the forwarding plane provides the second packet to the next hop location.

13. The method of claim 12, wherein the next hop location is an in-box service module slot or port.

14. The method of claim 12, wherein the next hop location is a tunnel to an out-of-box service.

15. A method for providing service selection in a service insertion architecture data plane, the method comprising:
    receiving a first packet associated with performing a first logical service in a service path, wherein in the service path is non-linear and forks into more than one branch, the first packet containing first context information associated with the first logical service, the first context information including a unique combination of traffic class identifier and service sequence number;
    determining a next hop location based on the first context information;
    updating the context information in the packet to include a different service sequence number; and sending the updated packet to a forwarding plane for service chaining to the next hop location, wherein the forwarding plane is configured to evaluate the traffic class identifier and the first sequence number in a service insertion architecture (SIA) context against a switching table to determine the next hop location, wherein if the first packet and a second packet have the same traffic class identifier, they will undergo the same set of services in the service insertion architecture plane.

16. The method of claim 15, wherein each logical hop in the service path updates the service header in the packet with its own service sequence number before sending it to the forwarding plane for service chaining to the next hop.

17. The method of claim 16, wherein the forwarding plane uses the context information to determine the next hop location.

18. The method of claim 17, wherein the next hop location is an in-box service module slot or port, or a tunnel to out-of-box service.

* * * * *